(12) United States Patent
Vaidya

(10) Patent No.: US 9,513,783 B1
(45) Date of Patent: Dec. 6, 2016

(54) DETERMINING AVAILABLE SCREEN AREA

(71) Applicant: Amazon Technologies, Inc., Reno, NV (US)

(72) Inventor: Ashish Vaidya, Karnataka (IN)

(73) Assignee: Amazon Technologies, Inc., Seattle, WA (US)

(*) Notice: Subject to any disclaimer, the term of this patent is extended or adjusted under 35 U.S.C. 154(b) by 358 days.

(21) Appl. No.: 14/216,709

(22) Filed: Mar. 17, 2014

(51) Int. Cl.
*G06F 3/0484* (2013.01)

(52) U.S. Cl.
CPC .................... *G06F 3/0484* (2013.01)

(58) Field of Classification Search
CPC ............. G06F 17/30126; G06F 17/30716; G06F 17/30274; G06F 17/30958; G06F 17/30873; G06F 17/30961; G06F 17/30994; G06F 3/04886; G06T 11/206; H04M 1/72561
See application file for complete search history.

(56) References Cited

U.S. PATENT DOCUMENTS

| | | | | |
|---|---|---|---|---|
| 6,313,854 B1* | 11/2001 | Gibson | ................ | G06F 9/4443 715/746 |
| 6,717,596 B1* | 4/2004 | Nason | ................ | G06F 3/038 715/778 |
| 7,243,302 B1* | 7/2007 | Rej | ................ | G06F 17/212 715/200 |
| 7,516,400 B2* | 4/2009 | Ovetchkine | ........... | G06F 9/4443 715/234 |
| 8,286,176 B1* | 10/2012 | Baumback | ............ | G06F 9/5061 709/221 |
| 2003/0177501 A1* | 9/2003 | Takahashi | ................ | G09G 5/14 725/110 |
| 2003/0212862 A1* | 11/2003 | James | ................ | G06F 9/44573 711/115 |
| 2004/0205536 A1* | 10/2004 | Newman | ........... | G06F 17/30961 715/234 |
| 2004/0220723 A1* | 11/2004 | Gould Bear | ............ | G06F 3/023 701/532 |
| 2004/0227731 A1* | 11/2004 | Gould Bear | .......... | G06F 1/1632 345/160 |
| 2005/0097089 A1* | 5/2005 | Nielsen | ............. | G06F 17/30967 |
| 2005/0216826 A1* | 9/2005 | Black | ................. | G05B 23/0216 715/247 |
| 2005/0235351 A1* | 10/2005 | Seltzer | .................... | G06F 21/36 726/14 |
| 2008/0046473 A1* | 2/2008 | Miao | ................. | G06F 17/30306 |

(Continued)

*Primary Examiner* — Shen Shiau
(74) *Attorney, Agent, or Firm* — Thorpe North & Western LLP

(57) ABSTRACT

A technology is described for determining an available screen area for a computing device. An example method may include referencing the dimensions of a root view associated with an application in order to determine an available screen area for a device display. The available screen area may be a portion of the device display that is not occupied by an operating system GUI (Graphical User Interface). A child view attribute associated with a child view descending from the root view may include the dimensions of the root view. The child view attribute may be referenced by an associated application component to obtain the dimensions of the root view and display properties of the application component may be calculated based at least in part on the dimensions of the root view.

19 Claims, 10 Drawing Sheets

(56) References Cited

U.S. PATENT DOCUMENTS

| | | | | |
|---|---|---|---|---|
| 2010/0180233 A1* | 7/2010 | Kruzeniski | ............ | G06F 3/0482 715/834 |
| 2012/0159358 A1* | 6/2012 | Waher | .................... | G06F 9/4443 715/762 |
| 2014/0115606 A1* | 4/2014 | Hamzata | ................... | G06F 9/46 719/313 |
| 2014/0123074 A1* | 5/2014 | Estrem | .............. | H04M 1/72519 715/853 |
| 2014/0235222 A1* | 8/2014 | Gonen | ............. | H04M 1/72519 455/418 |
| 2014/0281897 A1* | 9/2014 | Goodger | ............. | G06F 17/2247 715/234 |
| 2014/0359518 A1* | 12/2014 | Wu | ..................... | G06F 3/04842 715/779 |
| 2015/0070357 A1* | 3/2015 | Tahan | ....................... | G06F 3/14 345/428 |
| 2015/0193284 A1* | 7/2015 | Hamzata | ................. | G06F 9/546 719/313 |
| 2015/0193285 A1* | 7/2015 | Hamzata | ............ | G06F 9/45533 719/313 |
| 2015/0193904 A1* | 7/2015 | Vermeulen | ................ | G06T 1/20 345/522 |
| 2015/0277673 A1* | 10/2015 | Ye | ....................... | G06F 3/04842 715/800 |

* cited by examiner

DETERMINING AVAILABLE SCREEN AREA

BACKGROUND

Operating systems executing on a computing device may expose APIs (Application Programming Interfaces) to applications that enable an application to request computing environment information for the computing device. For example, an application may obtain information related to a computing device's hardware, file systems, processing events, graphical user interface, etc. For instance, when an application is opened on a computing device, the operating system may be queried via an API to determine screen size dimensions for the computing device's display. In some cases the screen size dimensions returned may be the actual screen size of a computing device display and not an available screen area that accounts for operating system generated graphical user interfaces (e.g., a status bar, a tool bar, a start bar, etc.) that may be displayed on the computing device display.

Some computing devices may include a base operating system that provides one or more graphical user interfaces and a shell operating system that may provide additional graphical user interfaces. For example, a computing device may execute a base operating system that may be the lowest level of hardware management on a computing device, as well as an operating system shell that interfaces with the base operating system. Graphical user interfaces and related graphical user interface controls provided by a base operating system, as well as a shell operating system, that are displayed on a computing device may reduce an amount of screen space available to display an application when the graphical user interfaces are displayed in combination with an application.

DETAILED DESCRIPTION

Figure 1:
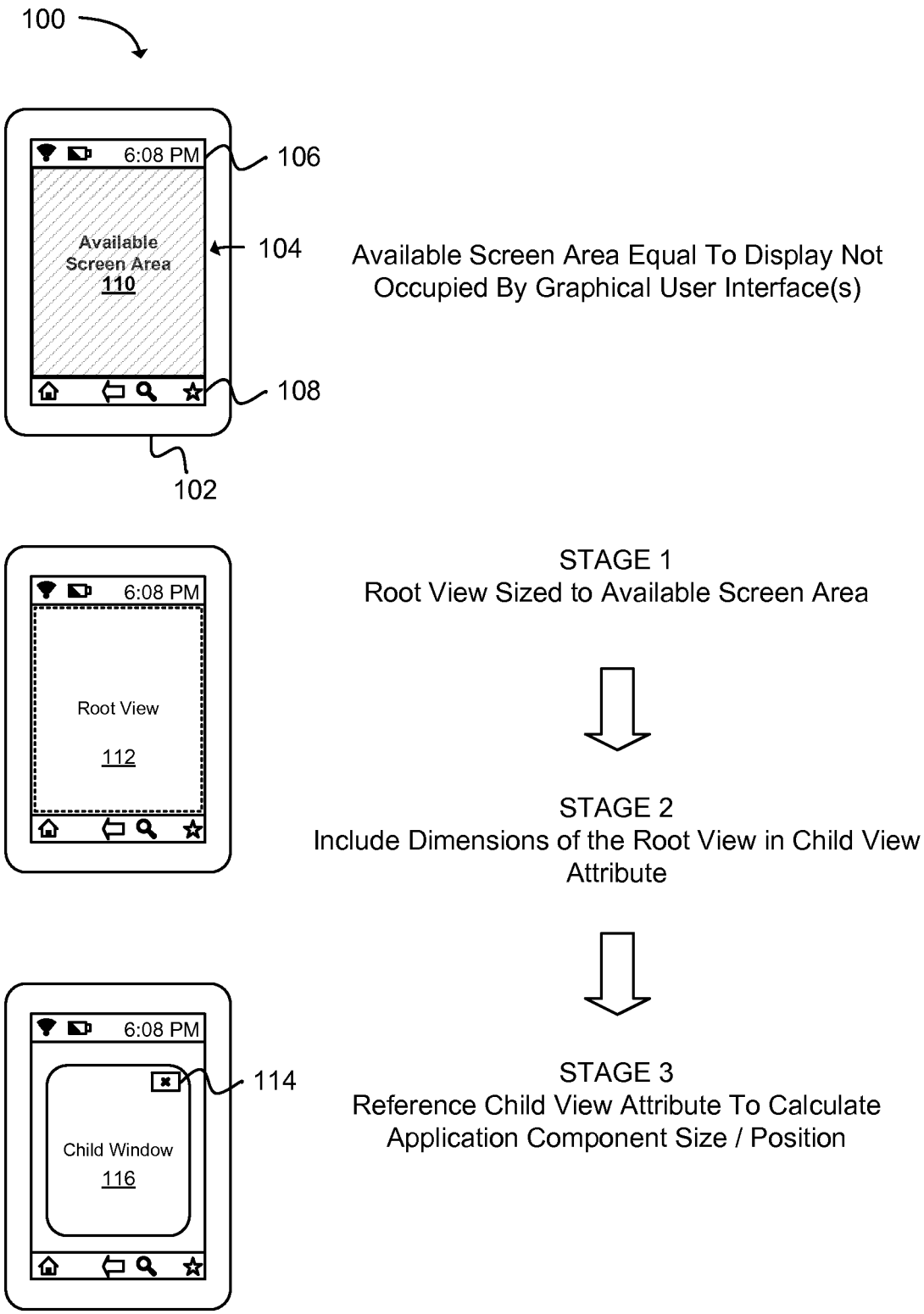
FIG. 1 is a diagram illustrating an example method for determining an available screen area for a mobile device.

A technology is described for determining an available screen area of a device display that may include one or more graphical user interfaces provided by an operating system (e.g., by a base operating system and/or an operating system shell) by referencing a root view attribute for the dimensions of the root view and including the dimensions in descending child views. A root view attribute may be an attribute associated with a root view in an application view hierarchy where child views related to the root view descend from the root view. In one example, a view (root or child view) may be an object that handles user interface interaction events (e.g., clicks, keystrokes, etc.) and may be included in an application's screen layout. A view may be a base class (e.g., structure) for application components (e.g., windows, drawable objects, text boxes, controls, etc.) within an application. An attribute linked to a view may be used to store information about the view (e.g., the dimensions of the root view), making the information available to child views that are descendants of the root view, as well as available to include in the child views via a child view attribute.

A parent window, in one example, may be a base application component comprising a window sized to the dimensions of a root view (i.e., an available screen area) where other child application components may be graphically drawn on top of the parent window. A root view may be linked to a parent window and child views may be linked to application components (e.g., child windows, drawable objects, controls, control groups, etc.) descending from the parent window. As such, a child view may be referenced to obtain information that may be included in a child view attribute.

When determining a size and/or screen position of a child component descending from a parent window, a child view attribute may be referenced to obtain the dimensions of the root view. Because the root view, when launched, may have been sized to the dimensions of the available screen area, the dimensions of the root view may be equal to the available screen area. As a result, the root view may be referenced to obtain the dimensions of the root view, which may be used in part to calculate the size and/or screen position of a child application component.

In one example configuration, upon launching an application, a root view may be sized to an available screen area and a parent window may then be displayed within the root view on a computing device display that may include one or more operating system GUIs (Graphical User Interfaces). The dimensions of the root view may be the same as the available screen area of the computing device display (i.e., the portion of the device display not occupied by an operating system GUI). For example, the dimensions of the root view may be the area of the computing device display not occupied by a status bar UI (User Interface) and/or a soft key UI. In order to make the available screen area available to application components that are descendants of the parent window, dimensions of the root view (i.e., the available screen size) may be included in child views associated with the application components. In one example, an application component (e.g., a child window, a drawable object, a control, etc.) that is a descendant of the parent window can reference a child view for an attribute that contains the dimensions of the root view (i.e., the available screen area), which may then be used to determine display properties for the application component. For example, a request to display an application component on a computing device display may be received, whereupon the child view attribute may be referenced and the size and/or screen position of the application component may be calculated based in part on the available screen area obtained from the child view attribute.

FIG. 1 is a diagram illustrating a high level example of a method 100 for determining an available screen area that may be used to calculate a size and/or screen position of a child application component. A computing device 102, such as, but not limited to, a mobile device may include a display 104 on which a number of operating system GUIs may be displayed. In this example, a base operating system installed on the computing device 102 may provide a status bar UI 106. Examples of a base operating system may include Android®, Blackberry®, Windows®, iOS®, etc. The status bar UI 106 may provide status information for the computing device 102, such as a date, time, network connectivity, battery information or any other information relating to the computing device 102.

Also in this example, an operating system shell may provide a soft key UI 108. A soft key UI 108 may be a software key bar having a number of user interface controls that allows a user to navigate a computing device 102 and access content available on the computing device 102. In one example configuration, a soft key UI 108 may be provided by an operating system shell that may be installed on a computing device 102 and may execute on top of a base operating system within an operating system hierarchy. A soft key UI 108 may, in one example, include a home control that allows a user to navigate to a computing device's home screen, a back control that allows the user to navigate backward through a hierarchical relationship between the computing device's display windows, a search control that allows a user to search content contained on the computing device and any other navigation control that may be included in a soft key UI 108.

A computing device 102 may include any number of operating system GUIs that may be provided by a base operating system and any number of operating system shells. The enumerated operating system GUIs above (i.e., the status bar UI 106 and the soft key UI 108) are merely one example configuration of a computing device 102 and any operating system GUI that may be included in a display 104 is within the scope of this disclosure.

In one example configuration, when launching an application on a computing device 102, an available screen area 110 may be calculated allowing a root view 112 of the application to be sized to the available screen area 110 and a parent window may be constructed and displayed within the root view 112. The available screen area 110 may vary depending on whether an operating system GUI (e.g., a status bar UI 106 and/or a soft key UI 108) may be displayed in combination with the parent window. For instance, in one mode, a status bar UI 106 and a soft key UI 108 may be displayed in combination with a parent window. In another mode, a status bar UI 106 may be displayed in combination with a parent window, and a soft key UI 108 may be minimized or hidden. And in another mode, all operating system GUIs (e.g., the status bar UI 106 and the soft key UI 108) may be hidden and only a parent window may be displayed. In one example, application settings may determine which of the above modes may be applied when the application is launched (i.e., whether an operating system GUI may be displayed in combination with a parent window).

After determining which, if any, operating system GUIs are displayed on the display 104, the available screen area 110 may be determined. For example, where a status bar UI 106 and a soft key UI 108 are to be displayed in combination with a parent window, the available screen area 110 may be the portion of the display 104 that is not occupied by the status bar UI 106 and the soft key UI 108. After determining the available screen area 110, the root view 112 may be sized to the dimensions of the available screen area 110 and the parent window may be constructed and displayed within the root view 112.

The available screen area 110 can be made available to child application components by referencing a root view attribute containing the dimensions of the root view 112 and including the dimensions in a child views (e.g., in a child view attribute) that descend from the root view 112. Because the root view 112 was sized to the available screen area 110 when the root view 112 was created, the root view dimensions may be equal to the available screen area 110. A root view 112 may be the topmost view in an application's view hierarchy. For example, where a root view 112 may be a topmost view in an application view hierarchy, the root view 112 may be accessible to child views that descend from the root view 112. As such, a root view attribute containing the dimensions of the root view 112 (i.e., the available screen area 110) may be included in child views. Thereafter, any child application component associated with a child view that is a descendant of the root view 112 may reference the child view for an available screen area attribute to obtain the available screen area 110 and calculate a size and/or a screen position based in part on the available screen area 110.

As an illustration, a first stage may include sizing a root view 112 to an available screen area 110. A second stage may include referencing a root view attribute associated with the root view 112 to obtain the dimensions of the root view 112 (i.e., the available screen area 110) and include the dimensions in any child views that descend from the root view 112. And a third stage may include referencing an attribute of a child view associated with a child window 116 and/or a control 114 to obtain the available screen area 110 (i.e., the dimensions of the root view 112). The child window 116 may be sized to a defined percentage of the available screen area 110, and the control 114, which may be placed on the child window 116 may be positioned on the child window 116 based in part on the available screen area 110 (e.g., the position of the control may be offset from the parent window based on the available screen area 110).

Figure 2:
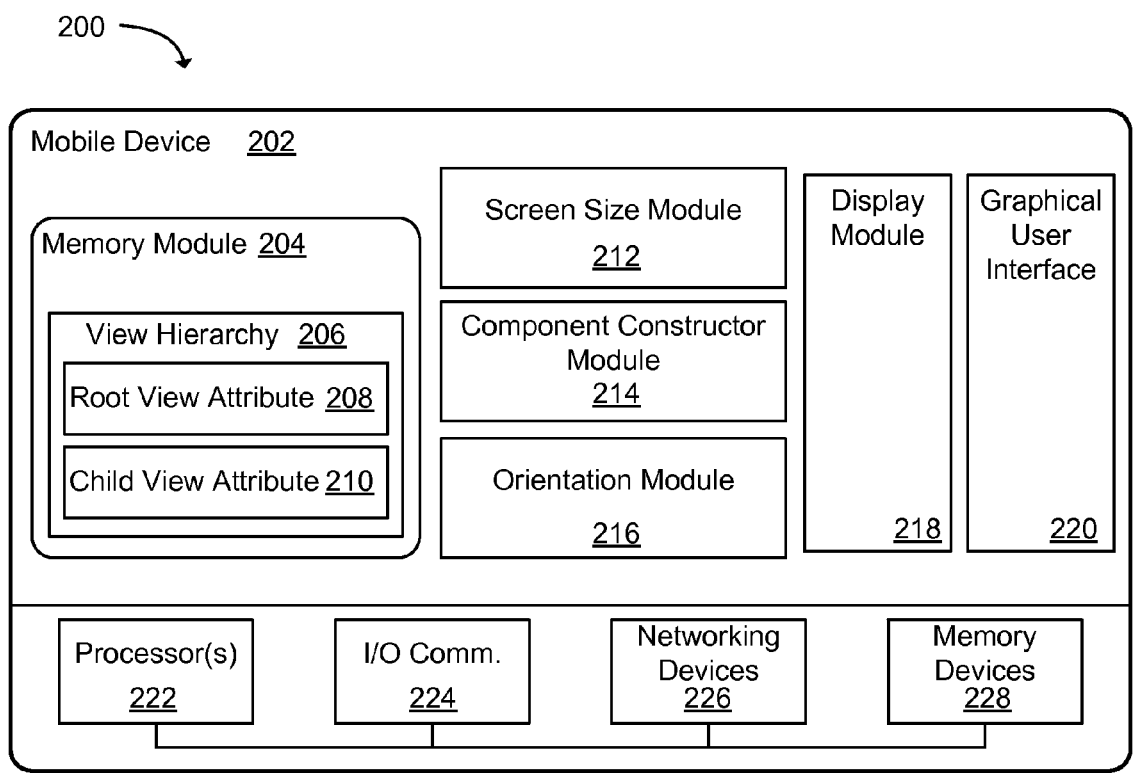
FIG. 2 is a block diagram illustrating an example mobile device system used to determine an available screen area.

FIG. 2 illustrates an example of a system 200 that includes a mobile device 202 on which the technology may be executed. The mobile device 202 may be a computing device, such as a tablet computer, e-book reader, smartphone or similar device. The mobile device 202 may include various components used to execute the technology. In one example configuration, the mobile device 202 may include a screen area module 212, a component constructor module 214, an orientation module 216 as well as other services, processes, systems, engines, or functionality not discussed in detail herein.

The screen area module 212 may be used to determine an available screen area of a mobile device display in which application content may be displayed. The dimensions of a mobile device display in which application content may be displayed may vary. In one example, a mobile device display may include operating system GUIs, such as a status bar UI provided by a base operating system and/or a soft key UI (User Interface) provided by an operating system shell. An application parameter may specify whether certain operating system GUIs may be displayed in combination with an application. For example, an application parameter may specify that a mobile device display not include any operating system GUIs when displaying an application window, making an available screen area equal to the actual physical screen size of the mobile device display. Also, an application parameter may specify that only certain operating system GUIs are to be displayed when displaying an application window, making an available screen area equal to the portion of the mobile device display not occupied by an operating system GUI.

Because the screen area in which content may be displayed may vary, the physical dimensions of a mobile device display returned by an operating system API (Application programming Interface) may not be sufficient for determining the available screen area for the mobile device display. For instance, making an operating system API request for a screen size may result in the return of dimensions that are the actual height and width of a physical mobile device display. Thus, any portion of the mobile device display that may be occupied by an operating system GUI may be included in the screen size, making the screen size returned by the operating system API an inaccurate representation of an available screen area that includes an operating system GUI.

In one example configuration, an accurate available screen area may be obtained by referencing a root view attribute after an associated root view is sized on a mobile device display. For example, upon launching an application, a system process may determine an available screen area in which to display a parent window associated with the application by referencing the application's properties and determining whether any operating system GUIs are to be displayed in combination with the parent window. A root view (an object that handles user interface interaction events for the parent window) may be sized to the available screen area and the parent window may then be rendered within the root view. Because the dimensions of the root view may be equal to the available screen area, the dimensions of the root view, which may be available in a root view attribute 208, may be referenced and may be included in a child view descending from the root view by setting a child view attribute 210 to the root view dimensions. Thereafter, any child application component that is a descendent of the parent window may reference an associated child view attribute 210 to obtain the available screen area. The available screen area may then be used in determining a size and/or a screen position of the child application component.

The root view attribute 208 and the child view attribute 210, in one example configuration, may be stored in a memory module 204, such as RAM (Random Access Memory). The root view attribute 208 and the child view attribute 210 may be included within an application component view hierarchy 206, where a root view may be the topmost parent view in the view hierarchy 206 and child view attributes may descend from the root view.

The orientation module 216 may be configured to detect a change in orientation of the mobile device 202 that results in redrawing a parent window. For instance, changing the mobile device's orientation may cause the mobile device display to change display modes (e.g., landscape mode and portrait mode). When the display mode changes (e.g., from landscape mode to portrait mode), the display (e.g., application components) may be redrawn on the mobile device display. The orientation of the mobile device 202 may determine an orientation and size of an operating system GUI (e.g., a soft key UI and/or a status bar UI). As a result, an accurate available screen area may be determined in part on a mobile device's orientation.

For example, when an application is launched, some UI components may be programmed to dynamically display at one edge of a mobile device display based on a display mode. As an illustration, an operating system GUI, such as a status bar UI may be set to display at the top of a mobile device display both in portrait mode and in landscape mode. As such, the size of the status bar UI may change based on the orientation of the mobile device 202 (e.g., the status bar UI may be sized smaller in portrait mode as compared to the size of the status bar UI in landscape mode). Because the display mode of a mobile device 202 may change the available screen area of a mobile device display due to an orientation of an operating system GUI, an available screen area stored in a root view attribute 208 and any child view attributes 210 may need to be updated based on the orientation of the mobile device 202. Therefore, upon detecting a change in orientation of the mobile device and/or a change in the display mode, the orientation module 216 may call the screen area module 212. The screen area module 212 may then be used to update the root view attribute 208 and any child view attributes 210 with the updated dimensions of the available screen area.

The component constructor module 214 may be used to calculate a child application component position and/or size based at least in part on a child view attribute associated with a child view. A child application component may be, for example, a child window, a drawable object, a control or other child application component descending from a parent window.

Upon an event (e.g., selecting a button control, a hyperlink, etc.) that creates a child application component, a child view attribute 210 may be referenced in order to obtain an available screen area, which may then be used to calculate a size and/or screen position of the child application component. As an illustration, upon selecting a button control within a parent window, an event may be triggered that creates a child window. The button control event may call the component constructor module 214, whereupon a button control view associated with the button control may be referenced, from which an available screen area stored in a child view attribute 210 associated with the button control view may be retrieved.

Having obtained an available screen area from the child view attribute 210, the size and/or screen position of a child application component may be calculated. As one example, dimensions of a child window size may be calculated by setting the dimensions of the child window to a defined percentage of the available screen area. As a specific example, dimensions for a child window may be set to 50% or 80% of an available screen area. Further, after sizing the child window, the child window may be positioned within the center of the available screen area. As another specific example, a screen position of a drawable object within an application window (e.g., a parent window or a child window) may be determined by offsetting the position of the drawable object based on the available screen area. Using the available screen area to determine in part a position for a child application component may help to avoid misalignment of the child application component within a mobile device display.

The display module 218 may be used to render application components on a mobile device display. For example, after a size and/or screen position of an application component may be determined, the application component may be rendered on a mobile device display. The mobile device display may be a touchscreen that displays an interactive graphical user interface 220. The mobile device 202 may include hardware processor devices 222, hardware memory devices 228, and Input/Output (I/O) device communication 224 to enable communication between the hardware devices and I/O components. Networking devices 226 may be provided for communication across a network with remote computing devices. The networking devices 226 may provide wired or wireless networking access. Examples of wireless network access may include cellular network access, WI-FI network access, or similar network access.

Figure 3:
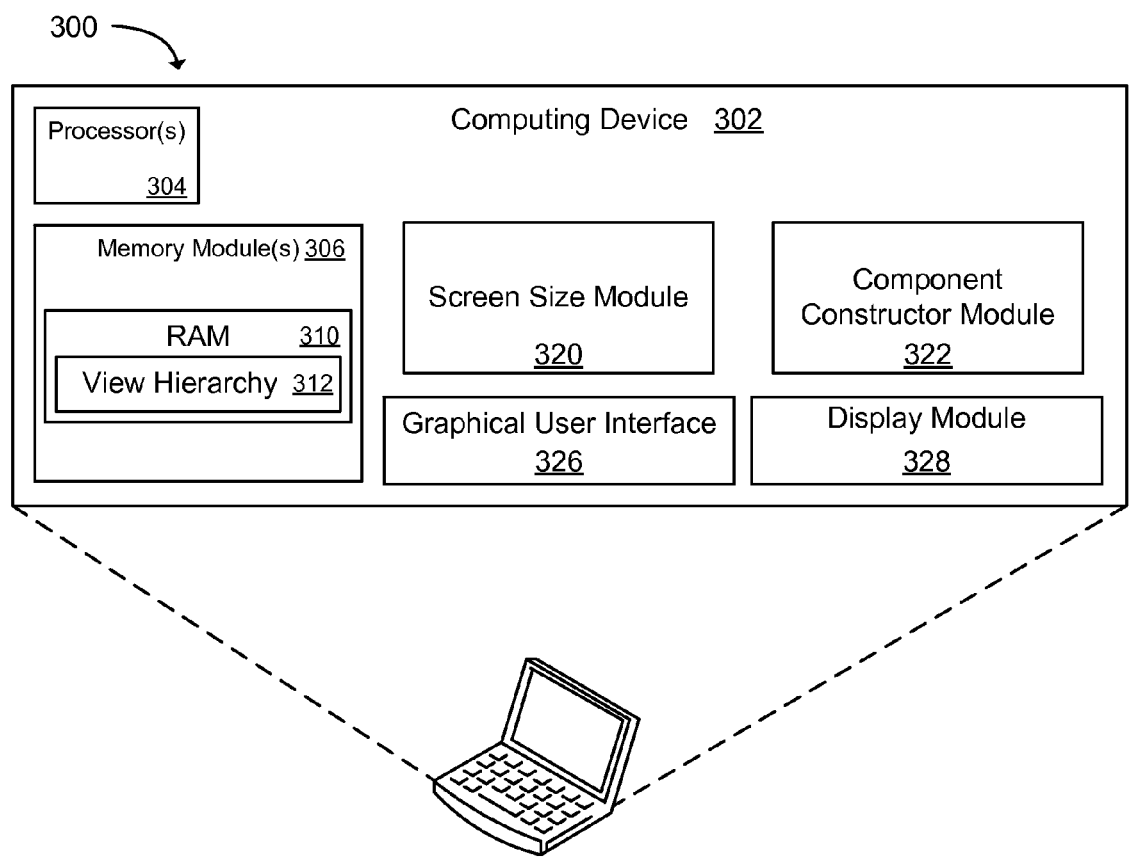
FIG. 3 is a diagram illustrating an example system for determining an available screen area for a computing device.

FIG. 3 illustrates an example of various components of a system 300 that may execute the technology on a computing device 302. The computing device 302 may include, but is not limited to, a desktop computer, laptop or notebook computer, tablet, workstation, network computer, or other devices with like capability. A computing device 302 may comprise, for example, a processor-based system having one or more processors 304, one or more memory modules 306 and a graphical user interface 326.

The computing device 302 may include a number of modules, similar to those described above in relation to FIG. 2. For example, the computing device 302 may include, a screen area module 320, a component constructor module 322, a display module 328 as well as other services, processes, systems, engines, or functionality not discussed in detail herein. The computing device 302 (e.g., a laptop) may include a display, such as a liquid crystal display (LCD) screen, gas plasma-based flat panel display, LCD projector, cathode ray tube (CRT), or other types of display devices, etc.

A memory module 306 may include RAM (Random Access Memory) 310 that is accessible to the computing device 302. Data stored in the RAM 310 may include, for example, a view hierarchy 312 associated with an application executing on the computing device 302. The view hierarchy may include a root view, from which a number of child views may branch out. The root view may be associated with a parent window and the root view may have a number of attributes that may contain information related to the root view. For example, an attribute may contain dimensions of the root view. In one example, the dimensions of the root view may represent an available screen area of a display for the computing device 302. Storage media comprising the memory module 306 may include volatile or non-volatile RAM (e.g. Flash RAM), optical media, hard-drive type media, a SAN (Storage Area Network), etc. The memory module 306 may be representative of a plurality of memory modules 306 as can be appreciated.

FIG. 2 and FIG. 3 illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. While FIG. 2 and FIG. 3 illustrate an example of a system that may implement the techniques above, many other similar or different environments are possible. The example environments discussed and illustrated above are merely representative and not limiting.

Figure 4:
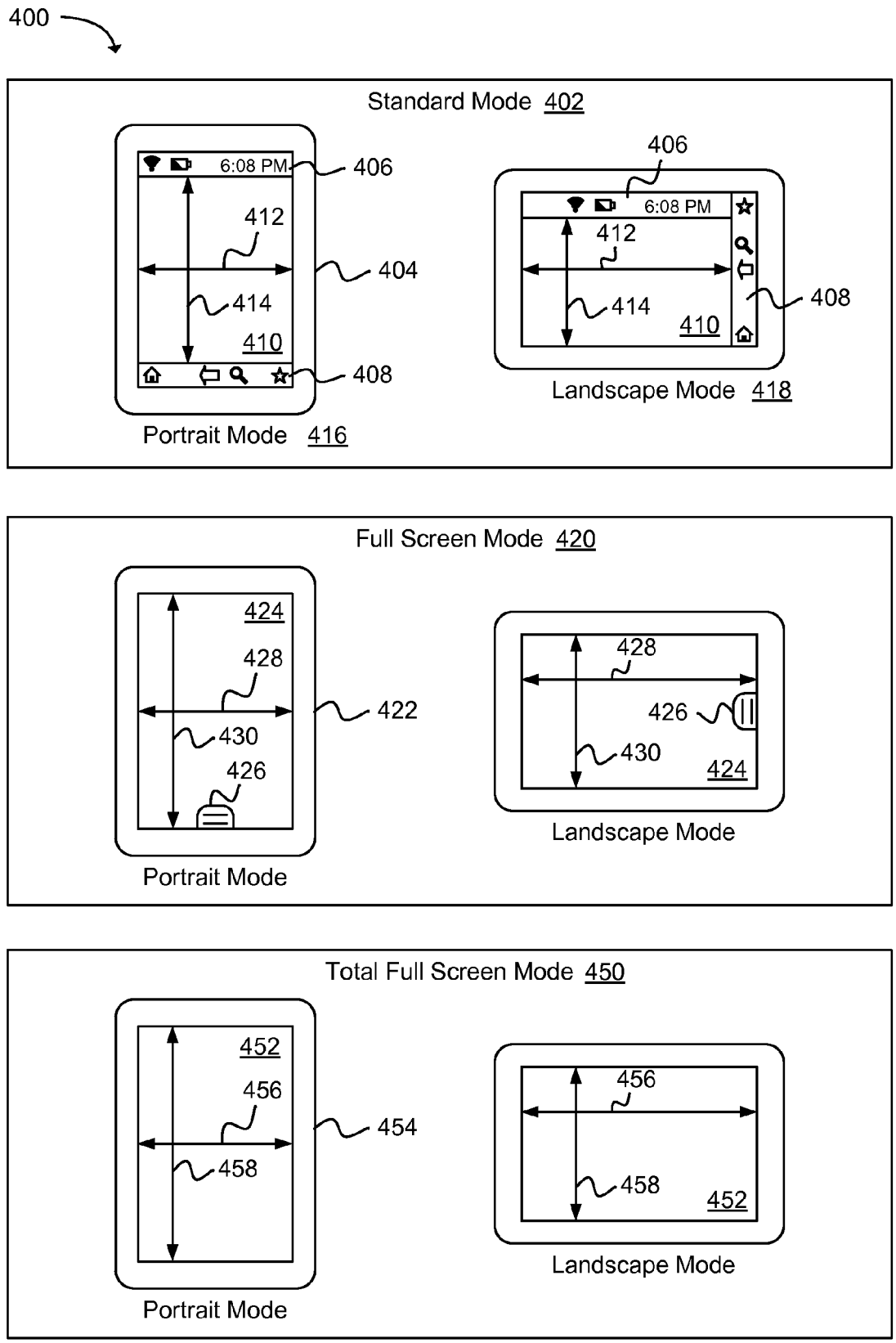
FIG. 4 is a diagram illustrating example screen modes that may determine whether an operating system GUI (graphical user interface) may be displayed in combination with an application on a mobile device.

Moving now to FIG. 4, various example display modes 400 for a mobile device are illustrated that may in part determine an available screen area in which an application window may be displayed. The example display modes 400 may include a standard mode 402, a full screen mode 420 and a total full screen mode 450. A display mode 400 may determine which, if any, operating system GUIs may be displayed in combination with an application window. In one example, a parameter associated with an application may specify which display mode 400 may be used when executing the application. For example, the parameter may specify that a standard mode 402, a full screen mode 420 or a total full screen mode 450 be used when displaying an application.

A standard mode 402, in one example, may display in combination with an application any operating system GUIs that may be available to display on a mobile device 404. Operating system GUIs may be user interfaces that allow a user to navigate a mobile device 404.

As an illustration of operating system GUIs that may be displayed on a mobile device 404, a mobile device display may include a status bar UI 406 and a soft key UI 408 where the status bar UI 406 may occupy a top portion of a display both in a portrait mode 416 and in a landscape mode 418, and a soft key UI 408 may occupy a bottom portion of the display in portrait mode 416, and a side portion of the display in landscape mode 418. The available screen area 410 of the display may be the portion of the display not occupied by the status bar UI 406 and the soft key UI 408. When executing an application having a parameter that specifies a standard mode 402, the application may be sized to the available screen area 410. Namely, the length of an application window may be sized to the length 412 of the available screen area 410 and the width of the application window may be sized to the width 414 of the available screen area 410.

One example method for determining an available screen area 410 for an application that includes a parameter specifying a standard mode 402 may include launching the application, whereupon any operating system GUIs available to display on a mobile device 404 are displayed and a root view may be sized to the dimensions of the available screen area 410 not occupied by the operating system GUIs. For example, the dimensions of the root view may be calculated by first identifying a total screen size of a device display (i.e., the physical width and height of the device display). Then the dimensions of any operating system GUIs may be identified and the operating system GUI dimensions may be subtracted from the total screen size. After sizing the root view to the available screen area 410, a parent window may be rendered to the dimensions of the root view. Thereafter, any child views descending from the root view may include an attribute containing the dimensions of the root view, which may be available to child application components.

When in standard mode 402, the available screen area 410 may vary based on the orientation of the mobile device 404 (i.e., portrait mode 416 and landscape mode 418). For example, a status bar UI 406 may occupy more display space while in landscape mode 418 and less display space while in portrait mode 416, thereby increasing or decreasing the length 412 and width 414 of the available screen area 410. As a result, when the orientation of the mobile device 404 changes, a root view attribute and any child view attributes may be updated with the new available screen area 410.

A full screen mode 420, in one example, may hide operating system generated operating system GUIs, with the exception of a handle 426 that may be used to display an operating system GUI, such as a soft key UI 408 when selected by a user. Thus, while in full screen mode 420, an application and a handle 426 associated with a soft key UI 408 may be displayed. Via a touchscreen, a user may select the handle 426 and perform a sliding motion that reveals the soft key UI 408. While in full screen mode 420, the soft key UI 408 may be minimized during times of nonuse by hiding the soft key UI 408 and displaying the handle 426 allowing for retrieval of the soft key UI 408. When executing an application having a parameter that specifies a full screen mode 420, the available screen area 424 may be equal to a length 430 and a width 428 of a display for a mobile device 422 that includes a portion of the display occupied by the handle 426, where the handle 426 may be displayed on top of an application. In other words, the full physical dimensions of a mobile device display may be available to display an application and the handle 426 may overlay a portion of the application. Further, when selecting the handle 426 to reveal a soft key UI 408, the soft key UI 408 may be displayed on top of (e.g. overlaid) the application, rather than resizing application windows to accommodate the soft key UI 408.

One example method for determining an available screen area 424 for an application that includes a parameter specifying a full screen mode 420 may include launching the application, whereupon operating system GUIs may be hidden (i.e., not displayed) except for one or more handles 426 used to retrieve an operating system GUI. A root view may be sized to the dimensions of the available screen area 424, which may be the actual physical dimensions of a mobile device screen. The dimensions of the root view may then be referenced and included in child views (e.g., a child view attribute), making the dimensions (i.e., the available screen area 424) available for sizing and/or placing child application components.

A total full screen mode 450, in one example, may hide the operating system GUIs, including any handles 426 associated with any operating system GUIs. As a result, the full dimensions of a mobile device display may be made available to display an application. While in full screen mode 450, the available screen area 452 may be equal to a length 456 and a width 458 of a display for a mobile device 454. An example method for determining an available screen area 452 for an application having a parameter specifying a total full screen mode 450 may be similar to the method described above, in that a root view may be sized to the dimensions of the available screen area 452, which may be the actual physical dimensions of a mobile device screen. It should be noted that the example display modes 400 described above are merely illustrations of display modes that may be used to provide a user with a graphical user interface in combination with displaying an application. Therefore, a method used to determine an available screen area is not limited to the example display modes 400 presented in FIG. 4.

Figure 5:
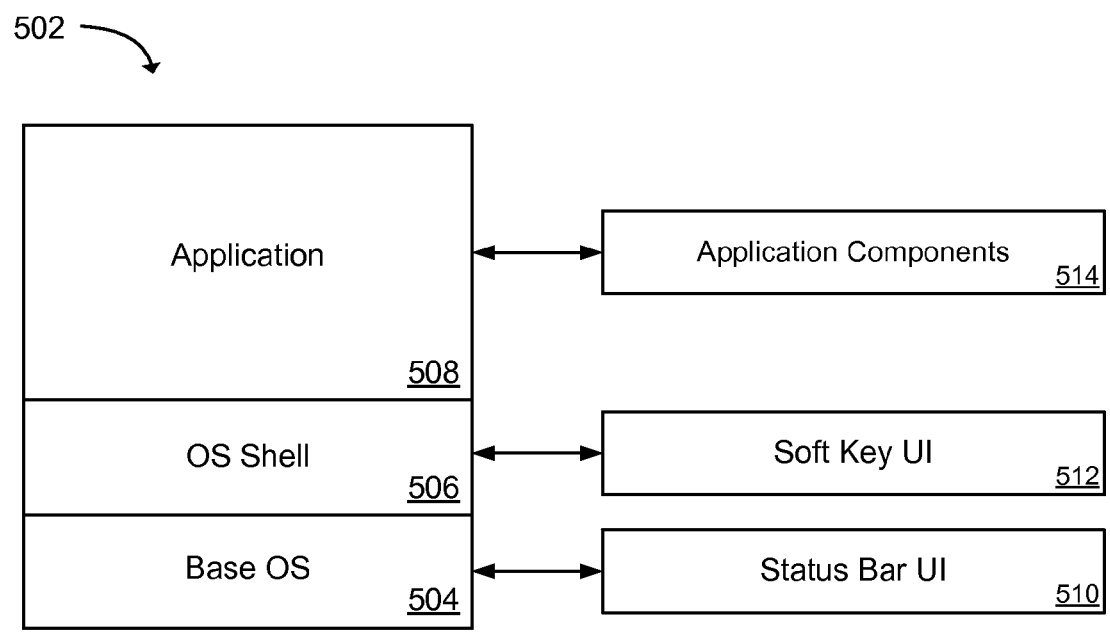
FIG. 5 is a block diagram illustrating an example software stack with associated software components.

As illustrated in FIG. 5, different operating systems may provide various operating system GUIs. For example, a base operating system 504, which may be the lowest level operating system in an operating system hierarchy 502, may provide an operating system GUI, such as a status bar UI 510 that provides certain system information. As a specific example, a status bar UI 510 may provide network status information, battery status information, application status information, etc. In another example, an operating system shell 506, which may be an outer layer operating system in the operating system hierarchy 502, may provide an operating system GUI, such as a soft key UI 512 providing navigation functionality similar to hardware keys used to navigate a mobile device. As a specific example, a soft key may perform the function of a home key that returns a user to a home screen. An application 508 executing on a mobile device may display application components 514 on a mobile device display where the application components 514 may be sized in order to accommodate any operating system GUIs provided by an operating system.

Figure 6A:
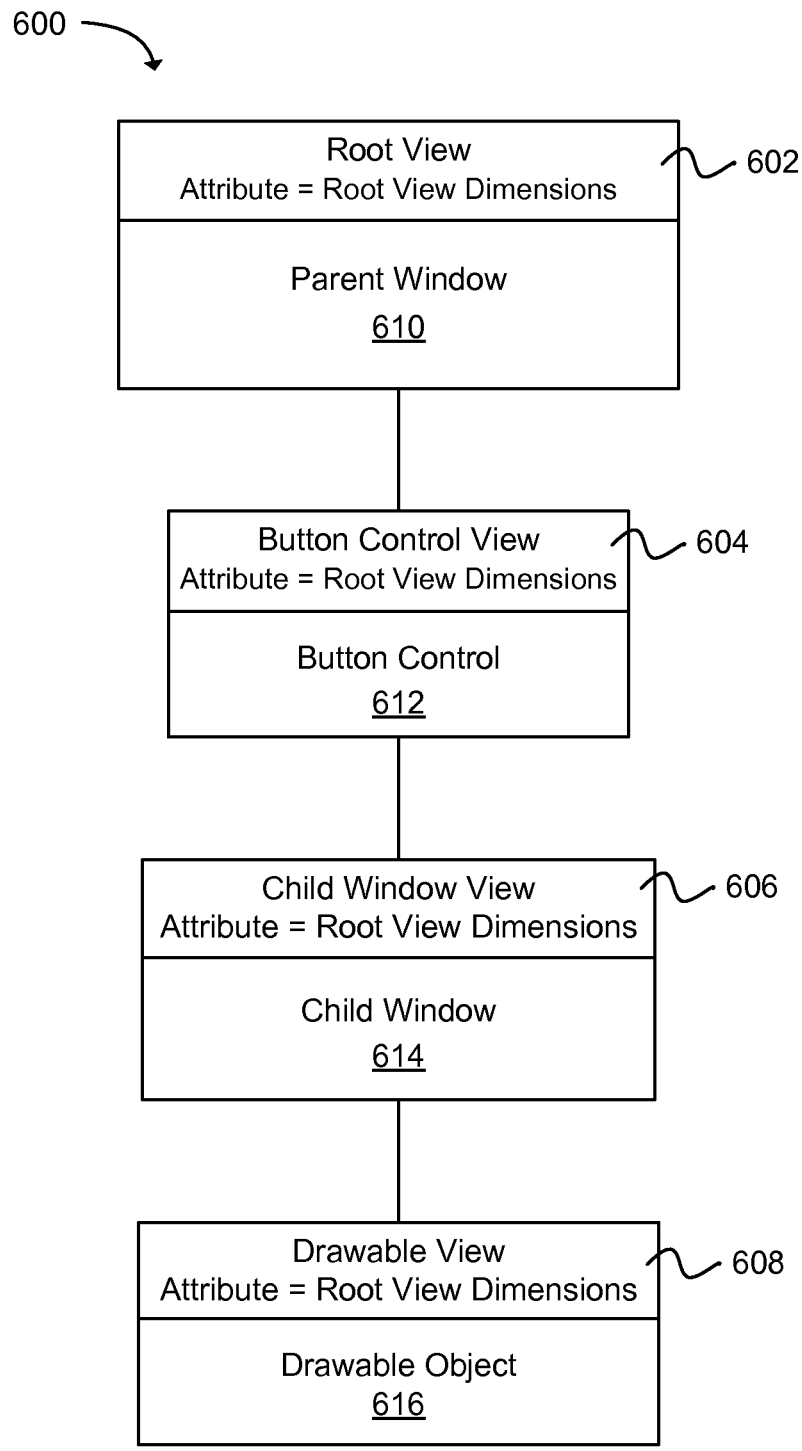
FIG. 6*a* is a block diagram illustrating an example view hierarchy used to identify a root view.

FIG. 6a illustrates an example of a view hierarchy 600 that may be built when constructing an application. As described earlier, a view may be an object that handles user interface interaction events (e.g., clicks, keystrokes, etc.) and may be included in an application's screen layout. A view may be a base class for application components (e.g., windows, text boxes, controls, etc.) within an application. An attribute linked to a view may be used to make a screen area available to various child application components that descend from a common parent window 610 associated with a root view 602. In this example, a root view 602, which may be a topmost view in the view hierarchy 600, may be associated with a parent window 610. The view hierarchy 600 may also include a button control view 604 that is associated with a button control 612, a child window view 606 associated with a child window 614 and a drawable view 608 associated with a drawable object 616. Upon loading an application into the memory of a computing device, the root view 602 may be created and sized to an available screen area of a computing device display and the parent window 610 may then be rendered and displayed on the computing device display. Because the root view 602 may have been sized to the available screen area of the computing device display, the dimensions of the root view 602 may be equal to the available screen size.

The views within the view hierarchy 600 may include attributes that contain information related to the view. For example, a root view 602 may include an attribute containing dimensions of the root view. Child views (e.g., 604-608) may include an attribute that may be used to store the dimensions of the root view 602, making the dimensions (i.e., the available screen area) available to an application component associated with a child view. As an illustration, a root view may be sized to an available screen area and then a parent window 610 may be rendered on a display screen within the dimensions of the root view 602. The parent window 610 may include a button control 612 that when clicked, may create an event (e.g., a button control click) that causes a child view to be generated and a child window 614 to be rendered. When calculating the size and position of the child window 614 to display on the display screen, the button control view 604 may be referenced to determine an attribute associated with the button control view 604 that contains dimensions of the root view 602. The attribute may then be referenced in order to obtain the dimensions of the root view 602, after which the size and dimensions of the child window 614 may be calculated based in part on the dimensions.

Additional child application components that may be rendered and displayed may also reference a child view attribute using the same method. For example, a drawable object 616 may be placed on the child window 614. When calculating the screen position of the drawable object 616, an associated drawable view 608 may be referenced obtain the dimensions of the root view from a drawable view attribute.

Figure 6B:
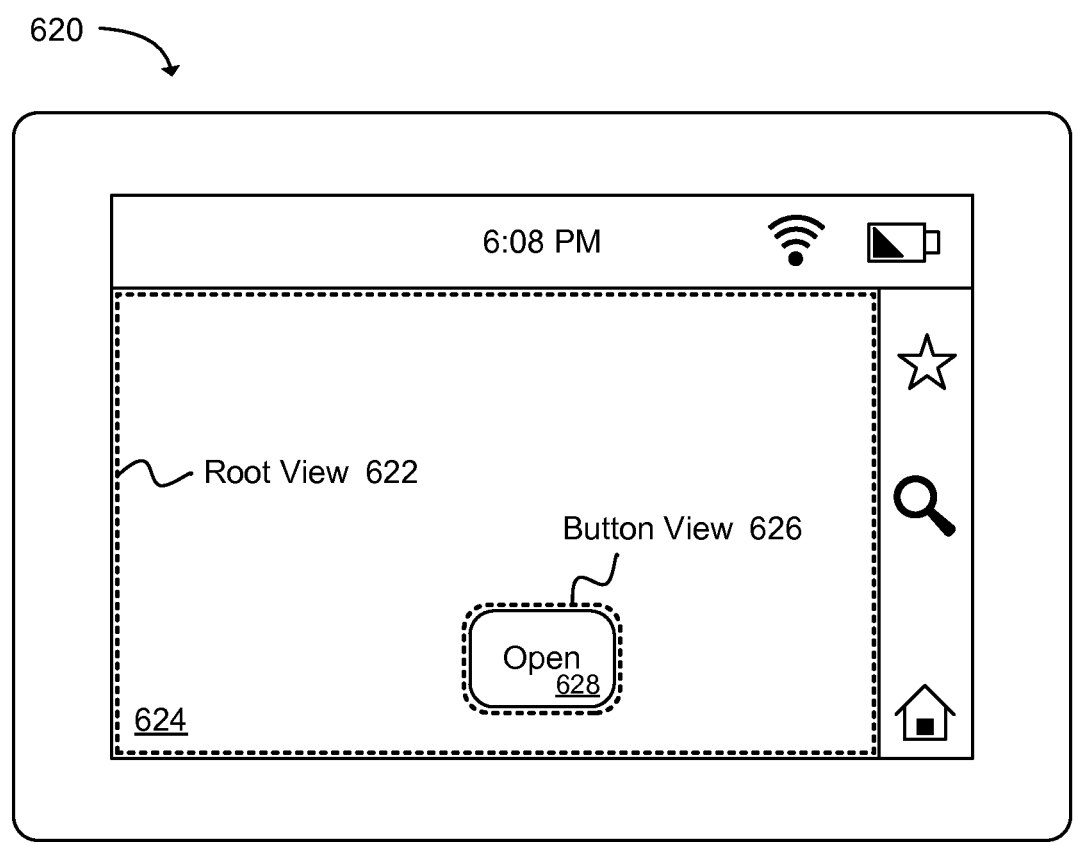
FIG. 6*b* is a diagram illustrating an example mobile device showing a relationship between a view and an application component.

FIG. 6b illustrates an example mobile device 620 showing a relationship between a view and an application component. As described earlier, the root view 622 may include an attribute containing the dimensions of the root view 622 (i.e., the available screen area). The available screen area may be used to calculate display properties for a child application component that may be launched as a result of the button control event. Views descending from the root view 622 may include an attribute that also contains the available screen size. In this example, a button view 626 may be associated with a button control 628. The button control 628 may be a UI control that when selected by a user may trigger an event (e.g., an event that launches a child window). Upon triggering the event, an attribute of the button view 626 may be retrieved from which an available screen area may be obtained and may be used to size and/or position an application component launched as a result of the button control event.

Figure 7:
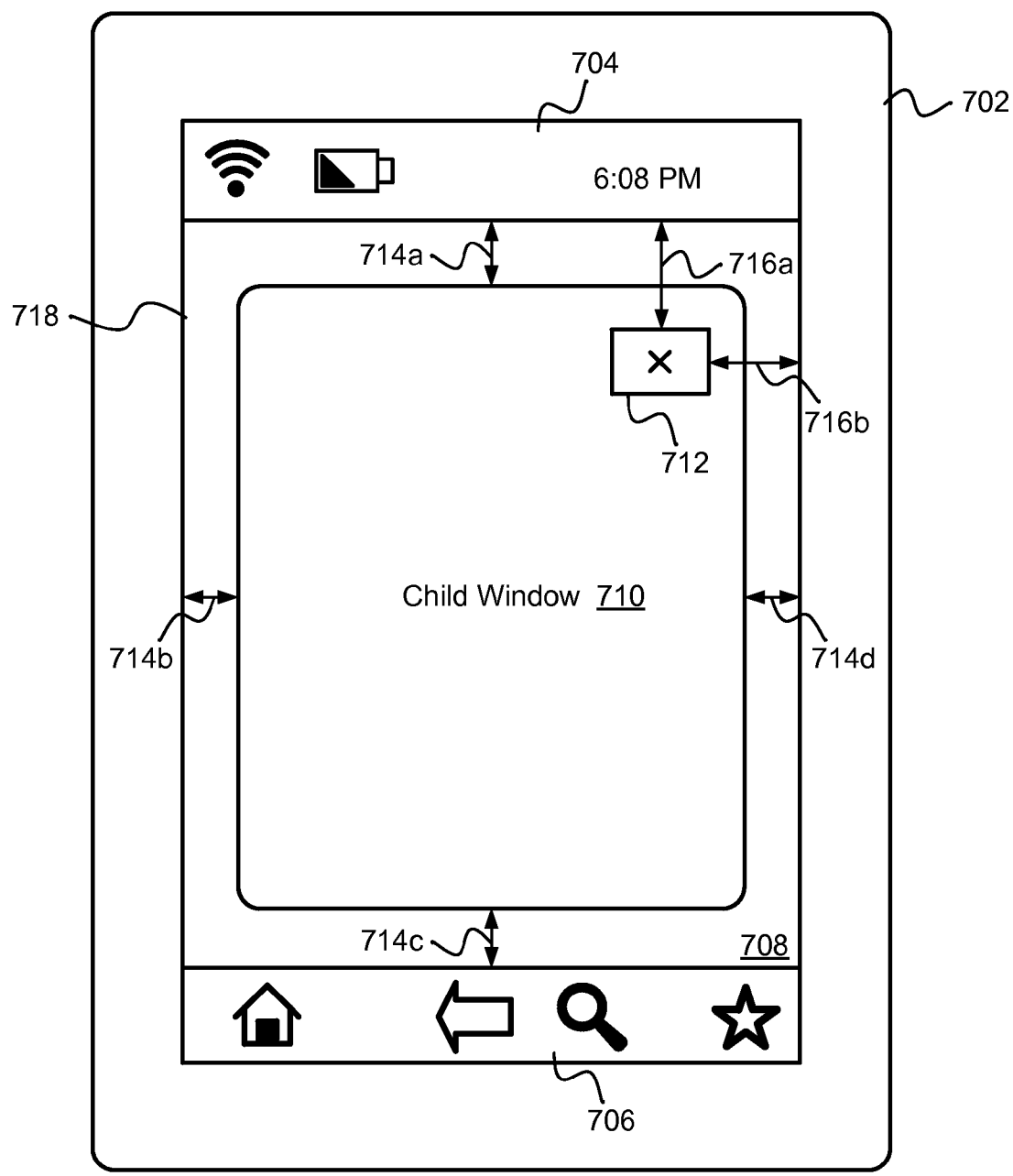
FIG. 7 is a diagram illustrating an example mobile device showing placement and sizing of child application components.

FIG. 7 is a diagram illustrating an example mobile device 702 showing a child window 710 and drawable object 712 that have been sized and/or positioned based in part on an available screen area 708. The mobile device 702 may include a display screen 718 that includes one or more operating system GUIs. In this example, the operating systems GUIs include a status bar UI 704 and a soft key bar UI 706. As described above, the presence of an operating system GUI may decrease an amount of available display space within the display screen 718 in which application components for an application may be displayed. Further, calling a system API for the dimensions of a display screen 718 for the mobile device 702 may not provide an available screen area 708, but rather the actual physical dimensions of the display screen 718. As a result, as described earlier, the actual physical dimensions returned by an operating system API call may not account for the portion of the display screen 718 occupied by the status bar UI 704 and the soft key bar UI 706. Therefore, the dimensions of a root view may be obtained from a view attribute and referenced to obtain the available screen area 708. The available screen area 708 may then be used to calculate a size and/or screen position of a child application component.

As an illustration of how the size and/or screen position of a child application component may be determined, FIG. 7 shows a child window 710 and a drawable object 712 that may be displayed on a display screen 718 based in part on an available screen area 708. When calculating dimensions for the child window 710, an available screen area 708 may be retrieved from an associated child view attribute and the dimensions of the child window 710 may be calculated based in part on the available screen area 708. In one example, the dimensions of the child window 710 may be based on a percentage of the available screen area 708. In another example, a predetermined number of units (e.g., points, inches, centimeters, pixels, etc.) may be subtracted from the available screen area 708. In yet another example, the child window 710 may be sized to the available screen area 708, making the dimensions of the child window 710 equal to the available screen area 708. In addition, after sizing the child window 710, the position of the child window 710 may be determined based in part on the available screen area 708. For example, the child window 710 may be positioned in the center of the available screen area 708, or at a predetermined offset 714*a-d* of an available screen area edge.

As illustrated, a drawable object 712 may be rendered and displayed on top of the child window 710. The screen position of the drawable object 712 may be based in part on the available screen area 708. For example, coordinates 716*a-b* may be specified for the drawable object 712 providing a layout engine with one or more reference points used to determine a screen position for the drawable object 712. If the coordinates 716*a-b* are used in combination with the actual physical dimensions of the display screen 718, a misalignment of the drawable object 712 may result. Therefore, in one example, the coordinates 716*a-b* may be used in combination with the available screen area 708. For example, the edges of the available screen area 708 may be used in determining an offset for the drawable object 712. In another example, the available screen area 708 may act as a reference coordinate system that is used to align the drawable object 712 with the coordinates 716*a-b* within the display screen 718. In another example case, predetermined offsets may be used to determine a screen position of the drawable object 712 based in part on an available screen area edge. As will be appreciated, the available screen area 708 may be used in part to calculate a size and/or screen position of any application component that may be displayed on the display screen 718 of a mobile device 702.

Figure 8:
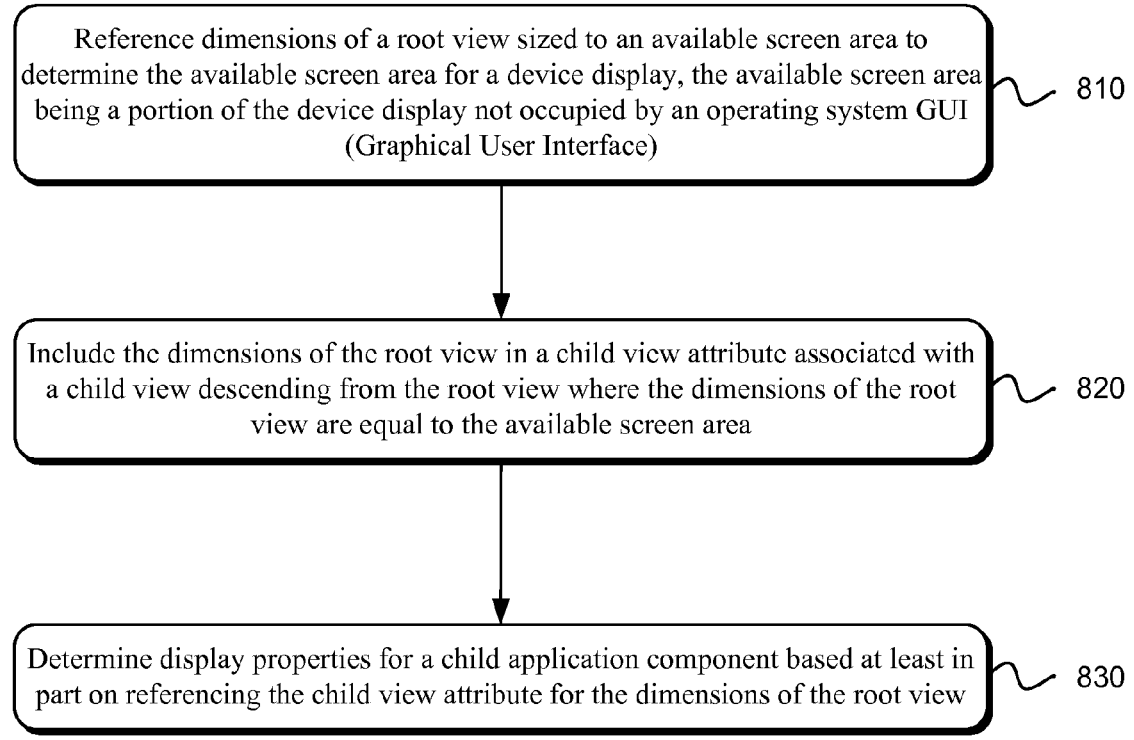
FIG. 8 is a flow diagram illustrating an example method for determining an available screen area.

FIG. 8 is a flow diagram illustrating an example of a method that may be used to determine an available screen size. Beginning in block 810, dimensions of a root view sized to an available screen area may be referenced to determine the available screen area for a device display, the available screen area being a portion of the device display not occupied by an operating system GUI. A root view may be a base application component for a parent window from which other application components may be related. For instance, an application may include a home screen (i.e., a parent window) that acts as a base screen to launch various application events.

An operating system GUI may enable a user to navigate a computing device, execute device and/or software functionality, view system information, view user interest information (social media, weather, news, etc.), as well as any other functionality that can be provided by an operating system GUI. Examples of operating system GUIs may include a status bar UI, a soft key UI, a GUI widget, a taskbar UI, a toolbar UI, etc. As will be appreciated, any number and/or type of operating system GUIs are within the scope of this disclosure. In one example, when an application is launched, an available screen area may be determined. The available screen area may be a portion of a device display not occupied by one or more operating system GUIs. A root view may then be sized to the available screen size and a parent window may be constructed and displayed within the root view.

Because the dimensions of the root view may be equal to the available screen size, as in block 820, the dimensions of the root view may be included in a child view attribute associated with a child view descending from the root view where the dimensions of the root view are equal to the available screen area. Views related to the root view within a view hierarchy may inherit the attribute containing the root view dimensions which can be referenced in order to obtain the available screen size.

As in block 830, display properties for a child application component may be determined based at least in part on referencing the child view attribute for the dimensions of the root view. For example, display properties, such as the dimensions of a child application component may be based in part on an amount of available screen space that is available to display the child application component on a device display. Further, display properties, such as the coordinates of a child application component may also be based in part on the size/boundaries of an available screen size. In one example, a child application component may determine an associated child view by referencing a view hierarchy associated with the child application component. An attribute containing the available screen area associated with the child view may then be referenced and the display properties for the child application component may then be calculated based in part on the available screen size.

Figure 9:
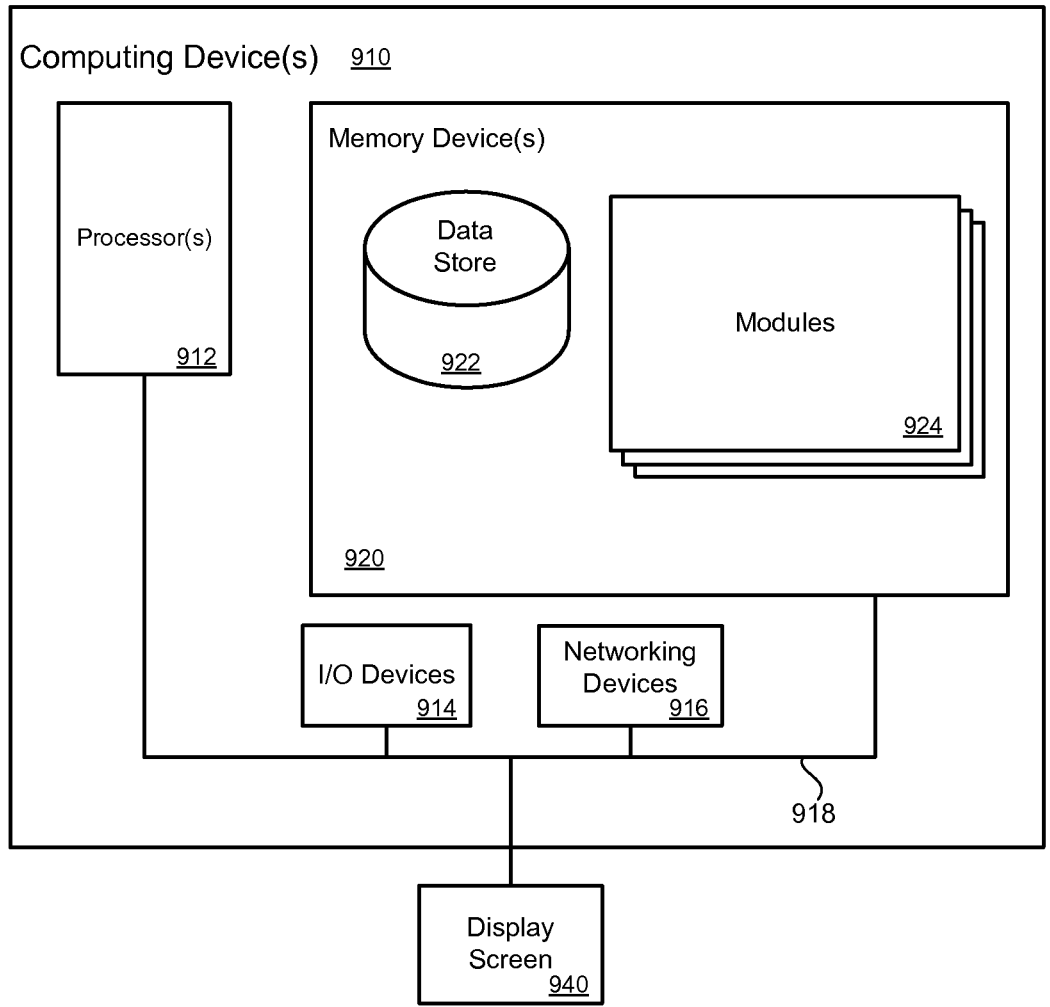
FIG. 9 is block diagram illustrating an example of a computing device that may be used to execute a method for determining an available screen area.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain services and modules 924 that are executable by the processor(s) 912, as well as data for the modules 924. Examples of modules 924 contained in the memory device 920 may include a screen area module, a component constructor module, an orientation module and other modules that may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 940 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for determining an available screen size, comprising:
   under control of a computer system configured with executable instructions,
   referencing a root view associated with an application on a mobile device display where the root view is sized to an available screen area for an available portion of the mobile device display not occupied by a status bar UI (User Interface) provided by a base operating system and a soft key UI provided by an operating system shell;
   copying dimensions of the root view into a child view attribute associated with a child view descending from the root view where the dimensions of the root view are equal to the available screen area;
   receiving a request to display a child application component on the mobile device display where the child application component is associated with a child view descending from the root view;
   referencing a child view attribute of a child view associated with the child application component for dimensions of the root view; and
   calculating display properties for the child application component based in part on the dimensions of the root view.

2. A method as in claim 1, further comprising displaying the child application component on the mobile device display based on the calculated display properties.

3. A method as in claim 1, wherein sizing the root view to an available screen area is determined in part by a screen mode for the application where the screen mode includes: a standard mode in which the status bar UI and the soft key UI are displayed on the mobile device display, a full screen mode in which the status bar UI is not displayed and the soft key UI is minimized on the mobile device display, and a total full screen mode in which the status bar UI and the soft key UI are not displayed on the mobile device display.

4. A method as in claim 1, wherein receiving a request to display a child application component further comprises receiving a request to display a child application component selected from at least one of: a child window, a drawable object, a control or a control group.

5. A method as in claim 1, wherein the soft key UI further comprises a soft key bar having an orientation determined by a mobile device orientation, the soft key bar comprising a plurality of controls that allow a user to navigate a mobile device associated with the soft key bar and access content available on the mobile device.

6. A computer implemented method, comprising:
   under control of a computer system configured with executable instructions,
   referencing dimensions of a root view sized to an available screen area to determine the available screen area for a device display, the available screen area being a portion of the device display not occupied by an operating system GUI (Graphical User Interface);
   copying the dimensions of the root view into a child view attribute associated with a child view descending from the root view where the dimensions of the root view are equal to the available screen area;
   determining display properties for a child application component based at least in part on referencing the child view attribute for the dimensions of the root view.

7. A method as in claim 6, wherein determining display properties for a child application component further comprises determining a screen position for the child application component based at least in part on the root view dimensions.

8. A method as in claim 6, wherein determining display properties for a child application component based at least in part on referencing the child view attribute further comprises determining a size of the child application component based at least in part on the root view dimensions.

9. A method as in claim 6, further comprising specifying a screen mode for an application and sizing the root view based on the screen mode where the screen mode determines the dimensions of the root view by indicating whether an operating system GUI is displayed, minimized or hidden on the device display.

10. A method as in claim 6, further comprising determining the dimensions of the root view by:
    identifying a total screen size of the device display where the total screen size is a width and a height of the device display;
    identifying dimensions of an operating system GUI; and
    subtracting the dimensions from the total screen size.

11. A method as in claim 6, further comprising identifying an orientation change of the device display that results in resizing the root view and updating the child view attribute with changes to the available screen area due to resizing the root view.

12. A method as in claim 6, wherein an operating system GUI is a status bar UI (User Interface) provided by a base operating system or a soft key UI provided by an operating system shell.

13. A method as in claim 6, wherein the root view attribute associated with the root view is an attribute of a topmost parent view in an application component view hierarchy where other views descend from the root view.

14. A method as in claim 6, further comprising launching a child application component upon an application event and referencing a child view associated with the child application component to obtain the available screen area from the child view attribute.

15. A method as in claim 14, wherein including the dimensions of the root view in a child view attribute associated with a child view further comprises referencing the root view to obtain the dimensions of the root view and including the dimensions in the child view attribute.

16. A method as in claim 6, wherein determining an available screen area for a device display further comprises determining an available screen area for a mobile device display.

17. A system for determining an available screen size, comprising:
    a processor;
    a memory device including instructions that, when executed by the processor, cause the system to:

determine an available screen area of a device display that includes a status bar UI provided by a base operating system and a soft key UI provided by an operating system shell by referencing dimensions of a root view sized to the available screen area and including the dimensions of the root view in a child view attribute of a child view that is a descendant of the root view; and reference the child view attribute to obtain the dimensions of the root view and calculate display properties for an application component based at least in part on the dimensions of the root view.

18. A system as in claim 17, wherein the memory device including instructions that, when executed by the processor, cause the system to determine a change in orientation of the device display that results in resizing the root view and updating the child view attribute with changes to the available screen area due to resizing the root view.

19. A system as in claim 17, wherein the memory device including instructions that, when executed by the processor, cause the system to determine a child view associated with an application component by referencing a view hierarchy associated with the application component where the view hierarchy maps an application component to a child view.

* * * * *